US011230071B2

(12) United States Patent
Gaillard et al.

(10) Patent No.: US 11,230,071 B2
(45) Date of Patent: Jan. 25, 2022

(54) APPLICATION HEAD COMPRISING MOVABLE CUTTING SYSTEM AND CLAMPING SYSTEM

(71) Applicant: CORIOLIS GROUP, Quéven (FR)

(72) Inventors: Loïc Gaillard, Lanester (FR); Julien Coudurier, Lorient (FR)

(73) Assignee: CORIOLIS GROUP, Quéven (FR)

( * ) Notice: Subject to any disclaimer, the term of this patent is extended or adjusted under 35 U.S.C. 154(b) by 0 days.

(21) Appl. No.: 16/767,504

(22) PCT Filed: Nov. 23, 2018

(86) PCT No.: PCT/FR2018/000257
§ 371 (c)(1),
(2) Date: Nov. 9, 2020

(87) PCT Pub. No.: WO2019/102084
PCT Pub. Date: May 31, 2019

(65) Prior Publication Data
US 2021/0107237 A1 Apr. 15, 2021

(30) Foreign Application Priority Data
Nov. 27, 2017 (FR) ........................................ 1701246

(51) Int. Cl.
*B29C 70/38* (2006.01)
*B29C 70/54* (2006.01)

(52) U.S. Cl.
CPC .......... *B29C 70/384* (2013.01); *B29C 70/541* (2013.01); *B29C 70/545* (2013.01); *B29C 2793/0027* (2013.01)

(58) Field of Classification Search
CPC ................ B29C 70/384; B29C 70/545; B29C 2793/0027
See application file for complete search history.

(56) References Cited

U.S. PATENT DOCUMENTS 7,849,903 B2 * 12/2010 Vaniglia ................ B29C 70/545
156/517
8,205,532 B2 6/2012 DeVlieg et al.
(Continued)

FOREIGN PATENT DOCUMENTS

DE 102013111100 A1 4/2015
DE 102015224689 6/2017
(Continued)

OTHER PUBLICATIONS

International Search Report and Written Opinion for PCT/FR2018/000257 dated Feb. 13, 2019.
(Continued)

*Primary Examiner* — Mark A Osele
*Assistant Examiner* — Christopher C Caillouet
(74) *Attorney, Agent, or Firm* — Patterson Thuente Pedersen, P.A.

(57) ABSTRACT

An application head, comprising an application system, guiding means defining a guiding plane, a cutting system comprising a first cutting tool movable in translation and a second cutting tool, and a clamping system comprising a first clamping tool movable in translation and a second clamping tool. A first control means is able to displace the cutting tools together between initial and final cutting positions representing a variation in distance along the guiding plane and a second control means is able to displace the clamping tools together between initial and final clamping positions representing a variation in distance along the guiding plane.

11 Claims, 14 Drawing Sheets

(56) References Cited

U.S. PATENT DOCUMENTS

| | | | |
|---|---|---|---|
| 10,821,682 B2 * | 11/2020 | Hamlyn | ............... B29C 70/384 |
| 2017/0197372 A1 | 7/2017 | Modin et al. | |
| 2020/0353703 A1 | 11/2020 | Gaillard et al. | |

FOREIGN PATENT DOCUMENTS

| | | | | |
|---|---|---|---|---|
| EP | 0846551 | | 6/1998 | |
| EP | 2228200 A1 | | 9/2010 | |
| ES | 22543005 | * | 5/2006 | ............ B29C 70/38 |
| FR | 3011499 | | 4/2015 | |
| WO | WO2008132301 | | 11/2008 | |
| WO | WO-2008132301 A2 | | 11/2008 | |
| WO | WO-2010070245 A1 | | 6/2010 | |
| WO | WO2017072421 | | 5/2017 | |
| WO | WO-2017072421 A1 | | 5/2017 | |
| WO | WO-2017097818 A1 | | 6/2017 | |

OTHER PUBLICATIONS

Application and File history for U.S. Appl. No. 15/733,136, filed May 27, 2020. Inventors: Gaillard et al.
International Search Report and Written Opinion for PCT/FR2018/000254, dated Feb. 27, 2019, 8 pages.
International Search Report and Written Opinion for PCT/FR2018/000255, dated May 14, 2019, 11 pages.

* cited by examiner

APPLICATION HEAD COMPRISING MOVABLE CUTTING SYSTEM AND CLAMPING SYSTEM

RELATED CASES

The present application is a National Phase entry of PCT Application No. PCT/FR2018/000257, filed Nov. 23, 2018 which claims priority from FR Patent Application No. 1701246, filed Nov. 27, 2017, which applications are hereby incorporated by reference in their entireties.

TECHNICAL FIELD

Embodiments of the present invention relate to an application head especially designed for producing composite material parts, and more particularly a fiber application head equipped with particular cutting system and clamping system. Embodiments also relate to a method for manufacturing composite material parts by means of a corresponding application head.

BACKGROUND ART

Fiber application machines are known for the application by contact on a layup tool, such as a male or female mold, of a fiber or a wide strip formed of one or more continuous flat fibers, of the tow type, dry or impregnated with thermosetting or thermoplastic resin, in particular carbon fibers, consisting of a multitude of carbon threads or filaments.

These fiber application machines, also called fiber placement machines, conventionally comprise an application head, a displacement system able to displace the application head, storage means for storing the fibers and conveying means for conveying the fibers from the storage means to the application head. The latter conventionally comprises an application roller for applying a strip of several fibers onto an application surface of a layup tool, a guiding system for guiding the fibers under the form of a strip to the application roller, and for each fiber, a cutting system for cutting a fiber, rerouting means for rerouting to the application roller fibers cut by the cutting system, and clamping means for clamping the fiber that has just been cut.

The cutting system comprises a first cutting tool movable in translation along a cutting direction between an inactive position and an active position to cut a fiber, and a second cutting tool.

The clamping system comprises a first clamping tool movable in translation along a clamping direction between an inactive position and an active position for clamping a fiber and a second clamping tool.

WO 2017/072421 describes such an application head, wherein the cutting system comprises a movable blade and a fixed blade or counter-blade, wherein the fiber is cut by shearing as the blade is displaced relative to the counter-blade. These cutting systems allow a greater number of cuts before they need to be replaced. In addition, these cutting systems allow for a guillotine type cut, using blades with an inclined cutting edge to progressively cut the fiber and thus reduce the cutting force. The cutting system is in a fixed position in the application head according to the fiber guiding plane. The same applies to the clamping system.

Such an arrangement leads to the observation that the cut end of a fiber may have an inclination with respect to the longitudinal direction of the fiber. The reason for this inclination is that during the time interval corresponding to the translation of the cutting tool, the application roller continues to apply the fiber being cut. The inclination of the cut end is greater the wider the fiber or the longer the time interval between inactive and active positions of the cutting and clamping tool(s).

EP 846 551 discloses an application head in which a cutting tool is movable in translation along a cutting direction and a cutting counter-tool is fixed along the cutting direction. The application head also includes a first clamping tool movable in a clamping direction and a clamping counter-tool fixed along the direction. The cutting tools and the clamping tools are integrally movable in translation along a fiber displacement direction. The displacement of the cutting system and the clamping system with the fiber being laid up ensures a good quality of cut, with a cut end substantially perpendicular to the longitudinal direction of the fiber. However, the control means used to move both the cutting system and the clamping system is cumbersome due to the large weight to be displaced. Furthermore, the rerouting means must be arranged upstream of the clamping tools in relation to the travel direction of the fiber, which implies a large fiber rerouting distance between the cutting system and the roller, increasing the risks of routing defects, and which may affect the accuracy of the deposit.

The purpose of embodiments of the invention is to propose a solution to overcome at least one of the above-mentioned drawbacks.

For this purpose, embodiments of the invention relates to an application head especially designed for producing composite material parts, comprising an application system, e.g. an application roller, guiding means defining a guiding plane, a cutting system and a clamping system, the cutting system comprising a first cutting tool movable in translation along a cutting direction between an inactive position and an active position, and a second cutting tool, the clamping system comprising a first clamping tool movable in translation along a clamping direction between an inactive position and an active position, and a second clamping tool, wherein it comprises first control means able to displace the cutting tools together between initial and final cutting positions representing a variation in distance along the guiding plane and comprises second control means, distinct from the first control means, able to displace the clamping tools together between initial and final clamping positions representing a variation in distance along the guiding plane.

The term "together" means that the cutting tools maintain their alignment along the cutting direction while being displaced. The same applies to the clamping tools in relation to the clamping direction.

The displacement together of the cutting tools allows them to displace together with the fiber while moving along the cutting direction. In this way, the inclination of the cutting edge can be reduced or even cancelled in the case of a guillotine type cut. In addition, because the speed difference between the cutting tools and the fiber is reduced or even eliminated, the abrasion that the cutting tools undergo due to the friction of the fiber is reduced, thus slowing down the wear of the blades. The cutting tools should preferably be displaced substantially at the same speed as the fiber displacement speed by the application roller. In the particular case where both cutting tools are movable along the cutting direction, the stroke of the tools necessary to cut the fiber will be reduced and the cut will be achieved more quickly. The use of separate control means for moving the cutting system and the clamping system with the displacement of the fiber makes it possible to use a low cumbersome control means for the cutting system while limiting the inclination of the cutting edge, and thus to offer a head with a reduced overall dimensions in the vicinity of the application system, which can be used for the layup on surfaces with complex geometries, in particular with a large concavity. In addition, the use of separate control means makes it possible to carry out relative displacements between the cutting system and the clamping system, and thus to offer a specific first control means with small overall dimensions.

Such separate control means furthermore make it possible to locate fiber rerouting means between the clamping system and the cutting system, and thus to offer an application head with a reduced fiber rerouting distance, limiting the risks of rerouting defects, guaranteeing good deposit accuracy, and increasing the deposit speed, insofar as the layup speed is generally reduced during rerouting in order to guarantee deposit quality.

According to an embodiment, the head according to embodiments of the invention further comprises, preferably for each fiber, rerouting means for rerouting a fiber to the application roller after a cut made by the cutting system, the rerouting means preferably being disposed between the clamping system and the cutting system.

In an embodiment, the first control means is an integrated control means able to displace the first cutting tool in translation along the cutting direction between an inactive position and an active position, and to displace together the cutting tools between the initial and final positions, preferably to displace together the cutting tools in rotation around a direction parallel to the rotation axis of the application roller of the application system between the initial and final positions.

The integrated control means according to embodiments of the invention is able to displace the cutting tools between a first state in which the cutting tools are in inactive position and initial position and a second state in which the cutting tools are in active position and final position. An integrated control means according to embodiments of the invention is adapted to reduce the overall dimensions of the cutting system in the application head while making the translational movement of at least the first cutting tool, along the cutting direction, with the movement to displace the cutting tools with the fiber applied by the application system, preferably a rotational movement of the cutting direction. It should be noted that this rotation imparts to the fiber a slight deviation from a direction of translation of the fiber. However, this deviation is kept within acceptable limits.

In this embodiment, the separate control means according to the invention for displacing the cutting system and the clamping system with the displacement of the fiber gives the possibility, after a cutting operation, to move the cut fiber end away from the cutting tools in the second state mentioned above, by maneuvering the clamping tools from their initial position and active position to their end position and active position, so that the cutting tools can subsequently be maneuvered to their second aforementioned state, without the risk of blocking or deforming the cut end of the fiber, and thus without the risk of altering its subsequent rerouting.

According to an embodiment, the integrated control means is able to displace the first cutting tool and the second cutting tool in translation along the cutting direction between inactive positions and active positions.

Advantageously, the integrated control means comprises a control lever movable around a first rotation axis and provided with a first lever arm articulated to a first tool holder carrying the first cutting tool and a second lever arm articulated, via a link, to a second tool holder carrying the second cutting tool, the second lever arm being controlled in displacement by a cylinder rod, the first blade holder being articulated to a second rotation axis by means of a link and the first and second tool holders being connected to each other by a sliding connecting means for sliding along the cutting direction.

In this arrangement, the first and second cutting tools are displaced in translation along the cutting direction. The sliding connection means ensures that the alignment of the cutting tools along the cutting direction is maintained while they are displaced together in rotation.

In another embodiment, the first means for controlling together the cutting tools is a means for controlling in translation along the guiding plane.

Preferably, the first and second cutting tools are movable one and the other along the cutting direction and a control means able to displace them comprises a cylinder actuating a cylinder rod cooperating with the cutting tools via a transmission cone or via first and second levers connected respectively to the first and second cutting tools.

Preferably, the first cutting tool comprises a first blade provided with a bevel defining a first cutting edge and the second cutting tool comprises a second blade provided with a bevel defining a second cutting edge, the bevels being opposed to allow an overlapping of the cutting edges.

This arrangement reduces or eliminates the risk of deforming the fiber during cutting. In the case of impregnated fibers, the risk of sticking the fiber to one or other movable cutting tool is reduced or eliminated. This allows a fiber to be cut "in the middle", that is, without deviation from the guiding plane defined by the guiding means.

This arrangement also slows down the wear of the cutting tools over time, since the cutting force is distributed over the two tools.

The cutting edges of the two blades can be rectilinear, curvilinear or have a broken line, for example V-shaped.

Rectilinear cutting edges can extend parallel to each other from the inactive to the active position of the blades in the cutting direction to instantly cut the fiber across its entire width.

Preferably they form a non-zero constant cutting angle, from the inactive positions of the blades to their active positions, one blade or both blades then having an inclined cutting edge, the cutting edge(s) forming an angle different from 90° with the cutting direction, the cutting edge(s) being inclined with respect to a direction perpendicular to the cutting direction. Preferably also the bisector of the cutting angle is perpendicular to the cutting direction, whereby both blades have an inclined cutting edge.

By this arrangement, the time interval is reduced in comparison with previous cutting systems. Indeed, the cutting point defined by the apex of the cutting angle propagates faster at the intersection of the cutting edges when the blades are both movable along the cutting direction. This arrangement also enables to cut wide strip of fibers with a reduced cutting force.

In order to cut a fiber "in the middle", that is without deviation of the fiber from the guiding plane, the blades will be fixed with respect to blade holders in such a way that the bisector of the cutting angle is contained in the fiber guiding plane and the blade holders will be displaced at a same translational speed to maintain the bisector in this plane, from inactive positions to active positions of the blades.

In another embodiment, the second control means for the clamping tools is a control means for controlling in translation along the guiding plane.

According to an embodiment, the clamping system comprises a third control means, distinct from the second control means, able to displace a first clamping tool in a clamping direction between an inactive position and an active position.

Preferably the first and second clamping tools are movable one and the other in the clamping direction between respective inactive and active positions, the third control means is preferably able to displace the first clamping tool and the second clamping tool in translation along the cutting direction between the inactive positions and the active positions. The third control means preferably comprises a cylinder actuating a cylinder rod cooperating with the clamping tools via a transmission cone or via first and second levers connected respectively to the first and second clamping tools.

By this arrangement, the clamping speed is increased compared to that of previous clamping systems. Indeed, the two clamping tools abut against each other more quickly in their respective active positions when they are both movable in translation along the clamping direction. The head according to embodiments of the invention equipped with such a clamping system facilitates the synchronization of the cutting system and the clamping system and ensures a more precise clamping of the fiber and thus a good precision in the location of the cut fiber ends during layup.

This arrangement advantageously allows a fiber to be clamped "in the middle", that is, without deviation from a median plane disposed at an equal distance from the guiding means. The inactive positions of the two clamping tools are preferably chosen symmetrically with respect to the median plane and the tools are displaced in the opposite direction at the same translation speed in order to bring them into abutment against each other in the median plane.

By this arrangement, the risk of deforming the fiber during blocking is thus reduced.

Advantageously, the application head comprises fixed stripper means fixed along the clamping direction, in positions relative to which the respective inactive positions of the clamping tools are set back. The stripper means comprise two stripping plates each provided with a through hole for the passage of a clamping tool, the two facing surfaces of the stripping plates are spaced apart from each other and are in positions with respect to which the inactive positions of the clamping tools are retracted. The inactive positions of the clamping tools set back relative to the stripper means allow a fiber, which would have remained stuck to the clamping tools abutting against each other in their respective active positions, to be easily detached. This reduces or even eliminates the risk of sticking the fiber to either of the movable clamping tools, especially in the case of pre-impregnated fibers.

Preferably, the second control means able to displace together the clamping tools is also able to displace the stripper means, in translation along the guiding plane.

Embodiments of the present invention also relate to a method for manufacturing a composite material part comprising the application of continuous fibers onto an application surface, wherein the application of fibers is carried out by means of a fiber application head as previously described, by relative displacement of the application head with respect to the layup surface along layup trajectories.

The fibers conventionally used are continuous flat fibers, also called tows, generally unidirectional, and comprising a multitude of filaments. The deposited fibers may be dry fibers or fibers preimpregnated with thermosetting or thermoplastic resin. The fibers are typically ⅛, ¼ or ½ inch wide. The term "fiber" in this document also refers to fibers of greater width, greater than ½ inch, conventionally referred to as tape in placement technology, for example, of 1 inch, 1.5 inch or 2 inches.

Other advantages of the invention will become apparent from the description of the embodiments illustrated by the drawings.

DETAILED DESCRIPTION

Figure 1:
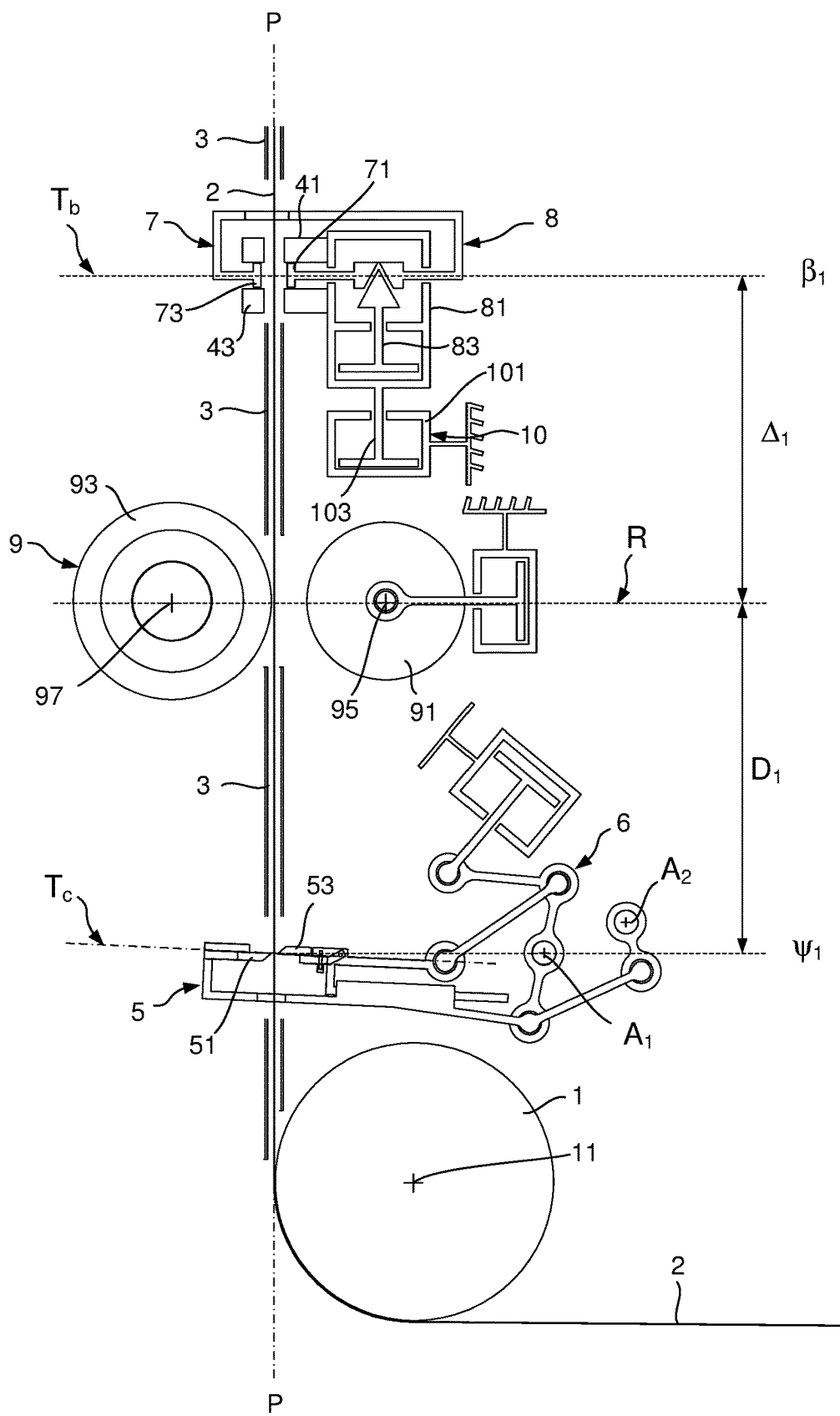
FIG. 1 is a schematic view of an application head according to a first embodiment of the invention, illustrating a cutting system and a clamping system in initial positions along a guiding plane.

According to a first embodiment of the invention, illustrated by FIGS. 1 to 14, an application head comprises an application roller 1, and for each fiber, guiding means 3 defining a guiding plane P for guiding the fiber entering into the head along a guiding plane towards the roller, a cutting system 5 and a clamping system 7. The guiding means of a fiber are for example formed by a guiding channel formed at the assembly interface of two plates, the guiding plane corresponding to a median longitudinal plane of the channel. When the head is intended for the application of a strip of several fibers, the head comprises a guiding channel for each fiber and a cutting system for each fiber, and may comprise a single roller for applying all the fibers, or several rollers, for example one roller for each fiber. Other guiding means may include tube sections or one or more pulleys.

The cutting system 5 comprises first and second cutting tools 51, 53 movable in translation along a cutting direction $T_c$ between two inactive positions $\kappa_1$, $\kappa_3$ and two active positions $\kappa_2$, $\kappa_4$. The cutting tools 51, 53 are movable together and displaced by a first control means 6 between an initial cutting position $\psi_1$ and a final cutting position $\psi_2$ representing a variation in distance along the guiding plane P.

The first control means 6 is an integrated control means able to displace the first and second cutting tools 51, 53 in translation along the cutting direction $T_c$ and to displace them together between the initial cutting position $\psi_1$ and final cutting position $\psi_2$, in rotation around a direction parallel to the axis 11 of the application roller 1, the integrated control means being adapted to displace the cutting tools between their inactive and initial positions and their active and final positions.

The integrated control means 6 comprise a control lever 61 movable around a first rotation axis $A_1$ and provided with a first lever arm 63 and a second lever arm 65, 66. A first blade holder 57 carrying the first blade 51 is articulated to the first lever arm 63. A second blade holder 59 carrying the second blade 53 is articulated to the second lever arm 65, 66 by means of a link 69. The lever 61 is controlled in displacement by the rod 67 of a cylinder, articulated to the second lever arm 65, 66. The first blade holder 57 is articulated to a second rotation axis $A_2$ by means of a link 60 and the first and second blade holders 57, 59 being connected to each other by a sliding connecting means 68 for sliding along the cutting direction.

The rotation axes $A_1$ and $A_2$ are fixed with respect to a support structure of the application head, the cylinder being fixedly mounted by its cylinder body to the support structure. It should be noted that the connection between the cylinder rod 67 and the intermediate link 66 can have a clearance, for example in the form of an oblong slot. Alternatively, the cylinder is mounted with a clearance with respect to the mounting support structure.

The rotation axes $A_1$ and $A_2$ are parallel to the guiding plane P and the rotation axis 11 of the compaction roller. In reference to FIG. 5, the first lever arm 63 is articulated by its end to the first blade holder 57 around a pivot axis $A_3$, and the second lever arm is articulated by its end to the cylinder rod around a pivot axis $A_4$, the two lever arms forming an angle between them, the axes $A_1$, $A_3$ and $A_4$ being not contained in a same plane. The link 69 is articulated by a first end to the second blade holder 59 around a pivot axis $A_5$ and by its second end to the second lever arm around a pivoting axis $A_6$, this pivot axis $A_6$ being arranged between axis $A_1$ and axis $A_4$, on the side of the plane passing through axis $A_1$ and axis $A_4$ which is opposite to axis $A_5$. In the present embodiment shown in the FIGS., the axis $A_1$, $A_3$ and $A_6$ are aligned, contained in the same plane, and the distance between the axes $A_1$ and $A_3$ is equal to the distance between the axes $A_1$ and $A_6$. The rotation axis $A_2$ is arranged on the side of the plane passing through the axes $A_1$ and $A_3$ which is opposite to the blades and to the axis $A_5$, the link 60 being articulated at one end around the fixed axis $A_2$ and at the other end to the first blade holder around a pivot axis $A_7$ which is arranged on the same side of the plane passing through the axes $A_1$ and $A_3$ as the axis $A_2$. The pivot axes $A_3$-$A_7$ are parallel to the rotation axes $A_1$ and $A_2$.

The clamping system 7 comprises first and second clamping tools 71, 73 movable along a clamping direction $T_b$ between two inactive positions $\theta_1$, $\theta_3$ and two active positions $\theta_2$, $\theta_4$ in which they abut against each other. The clamping tools comprise a first and a second jaw. A control means 8 is able to displace the first and second clamping tools 71, 73 in translation along the clamping direction $T_b$. It comprises a cylinder 81 actuating a cylinder rod 83 cooperating with the first and second clamping tools 71, 73 by means of a transmission cone 85.

The clamping tools 71, 73 are movable together in translation between an initial clamping position $\beta_1$ and a final clamping position $\beta_2$ representing a variation in distance along the guiding plane P. They are displaced by a second control means 10 comprising a cylinder 101 actuating a cylinder rod 103 able to displace the cylinder 81 of the second control means 8.

Stripper means 41, 43 are fixed in relation to a structure used as support for the mounting of the application head, and are therefore fixed in relation to each other in the clamping direction $T_b$. The inactive positions $\theta_1$, $\theta_3$ of the first and second clamping tools 71, 73 are set back along the clamping direction $T_b$ with respect to the fixed positions of the stripper means 41, 43. The stripper means 41, 43 are movable with the clamping tools 71, 73 in translation along the guiding plane and controlled in displacement by the control means 10.

The application head also comprises rerouting means 9. The latter comprise a first roller 91 and a second roller 93 whose rotation axes 95 and 97 are aligned along a direction R away from the rotation axis 11 of application roller 1. The rerouting means 9 have a fixed position with respect to the application roller 1, between the cutting tools 51, 53 on the one hand and the clamping tools 71, 73 on the other hand.

FIG. 1, the two cutting tools 51, 53 are in their initial position $\psi_1$ in which the distance along the guiding plane P between the cutting direction $T_c$ and the fixed position of rerouting means is equal to $D_1$. Similarly, the two clamping tools 71, 73 are in their initial position $\beta_1$ in which the distance along the guiding plane P between the clamping direction $T_b$ and the fixed position of the rerouting means is equal to $\Delta_1$. Along the cutting direction $T_c$, the cutting tools 51, 53 are in their inactive positions $\kappa_1$, $\kappa_3$. Along the clamping direction $T_b$, the clamping tools 71, 73 are in their inactive positions $\theta_1$, $\theta_3$.

Figure 2:
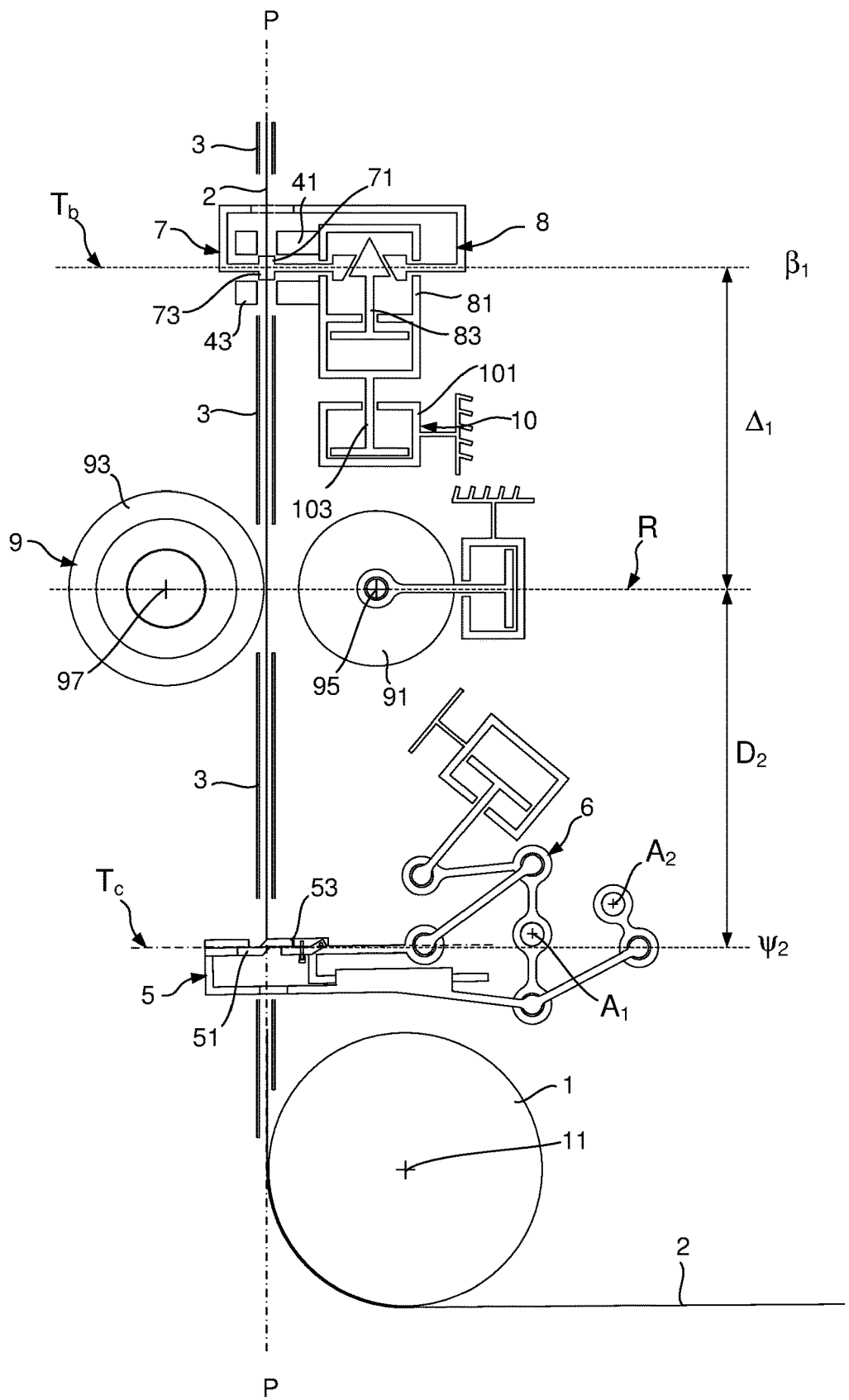
FIG. 2 is a schematic view of the application head, in which the cutting tools of the cutting system have displaced into an end position in the guiding plane.

FIG. 2, the two cutting tools 51, 53 have displaced together to their final position $\psi_2$ in which the distance along the guiding plane P between the cutting direction $T_c$ and the fixed position of the rerouting means is equal to $D_2$. The two clamping tools 71, 73 have remained in the initial position $\beta_1$ shown in FIG. 1. Along the cutting direction $T_c$, the cutting tools 51, 53 have displaced into their active positions $\kappa_2$, $\kappa_4$. Along the clamping direction $T_b$, the clamping tools 71, 73 have displaced into their active positions $\theta_2$, $\theta_4$.

Figure 3:
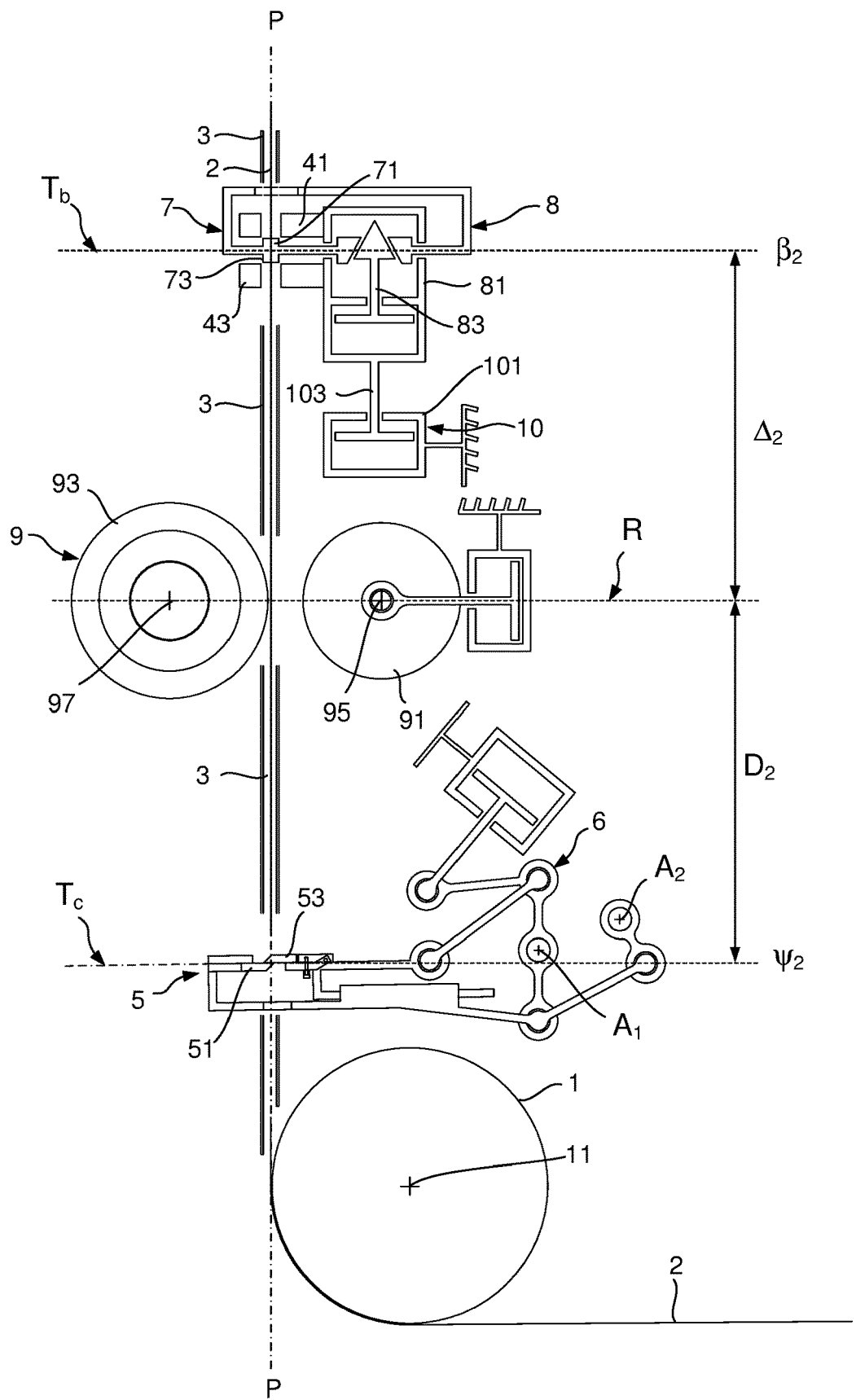
FIG. 3 is a schematic view of the application head, in which the clamping tools of the clamping system have displaced to an end position in the guiding plane.

FIG. 3, the two cutting tools 51, 53 have remained in their final position $\psi_2$ as shown in FIG. 2. The two clamping tools 71, 73 have displaced together into their final position $\beta_2$ for which the distance along the guiding plane between the clamping direction $T_b$ and the fixed position of the rerouting means is equal to $\Delta_2$.

Figure 4:
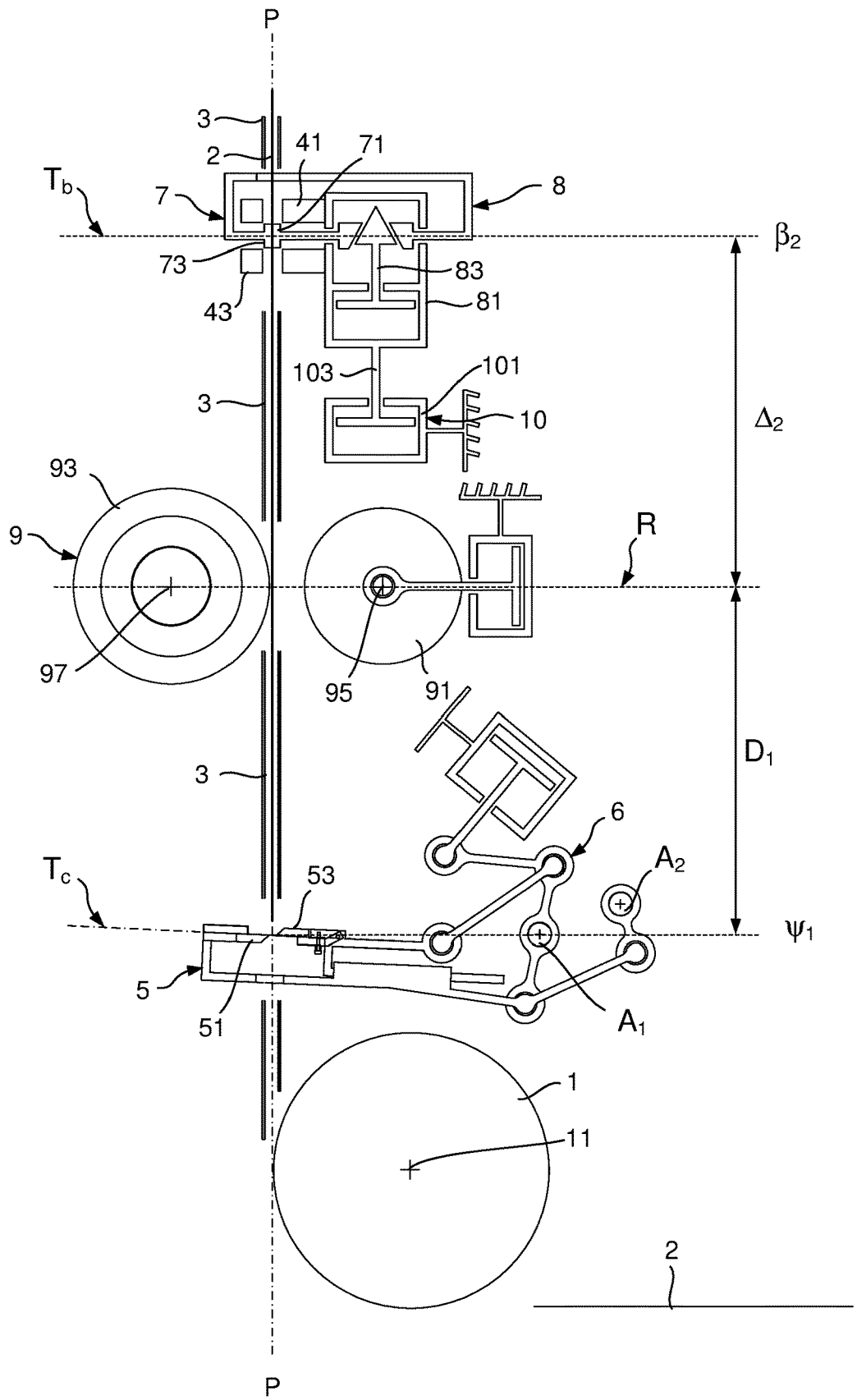
FIG. 4 is a schematic view of the application head, in which the cutting tools of the cutting system are again in the initial position in the guiding plane.

FIG. 4, the two cutting tools 51, 53 have displaced together to their initial position ψ$_1$ shown in FIG. 1. The two clamping tools 71, 73 have remained in their final position β$_2$ shown in FIG. 3. Along the cutting direction T$_c$, the cutting tools 51, 53 have displaced to their inactive positions κ$_1$, κ$_3$.

The initial distances D$_1$ and Δ$_1$ are smaller than the final distances D$_2$ and Δ$_2$. Thus, the initial and final cutting positions ψ$_1$, ψ$_2$ represent a positive variation of distance D$_2$-D$_1$ along the guiding plane P and the initial and final clamping position β$_1$, β$_2$ represent a positive variation of distance Δ$_2$-Δ$_1$ along the guiding plane P.

It is important to note that the direction R of the rerouting means is an arbitrary reference for the distances D$_1$, Δ$_1$, D$_2$ and Δ$_2$. The direction perpendicular to the guiding plane P and passing through axis 11 of the application roller 1 is another arbitrary reference for locating the distances. It is sufficient that the reference direction is perpendicular to the guiding plane and has a fixed position in the application head.

Figure 5:
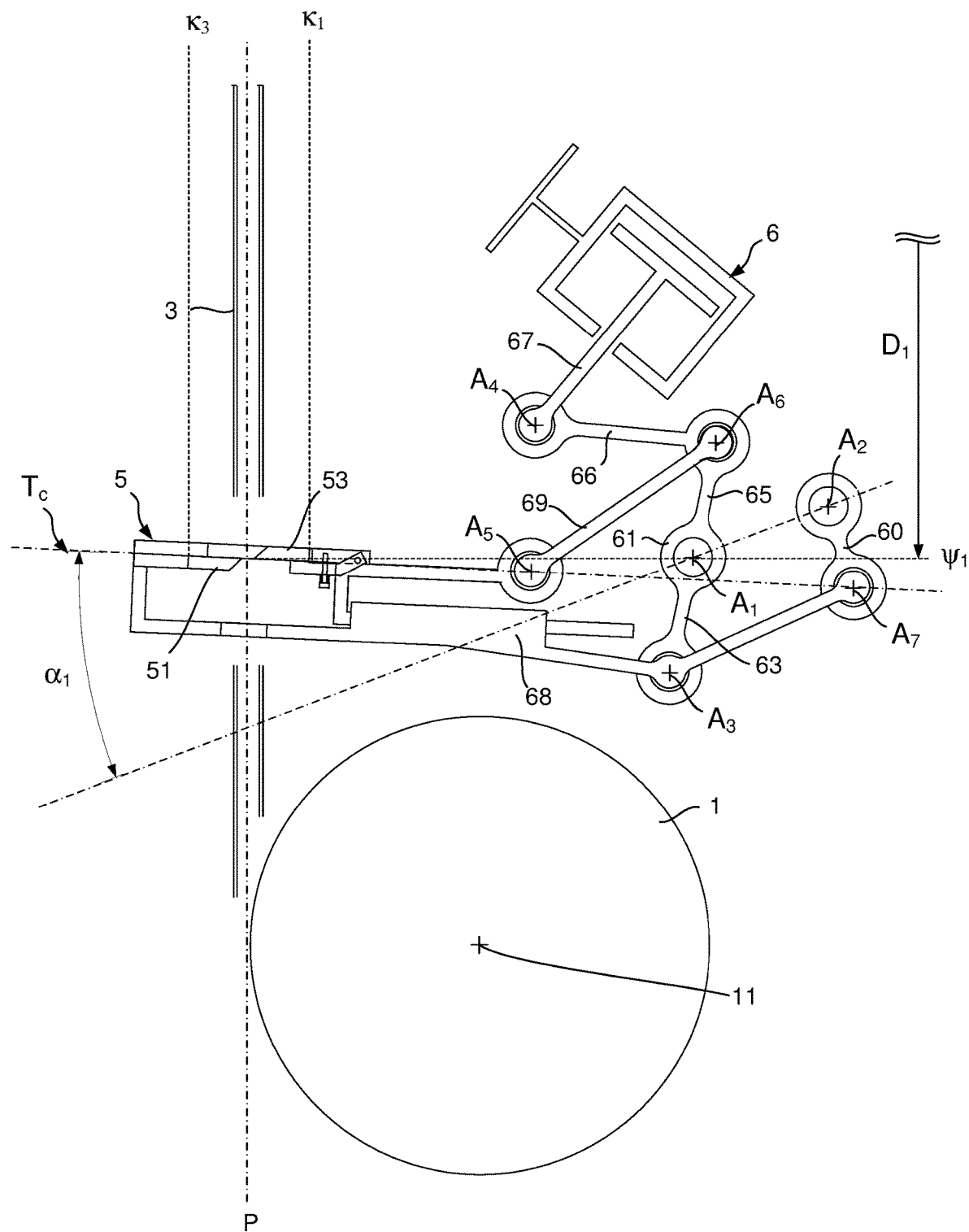
FIG. 5 is a schematic view of the cutting system, showing the cutting tools in the initial position along the guide plane and in two inactive positions along the cutting direction.

FIG. 5, the two cutting tools 51, 53 are in their initial position 1 in which the distance along the guiding plane P between the cutting direction T$_c$ and the fixed position of rerouting means is equal to D$_1$. The tools 51, 53 are in the inactive positions κ$_1$, κ$_3$ along the cutting direction T$_c$. The cutting direction T$_c$ makes an angle α$_1$ with the direction passing through the rotation axes A$_1$ and A$_2$. This angle as well as the inactive positions κ$_1$, κ$_3$ in cutting direction T$_c$ are determined by the angular orientation of the control lever 61, itself determined by the retracted position of the cylinder rod 67.

Figure 6:
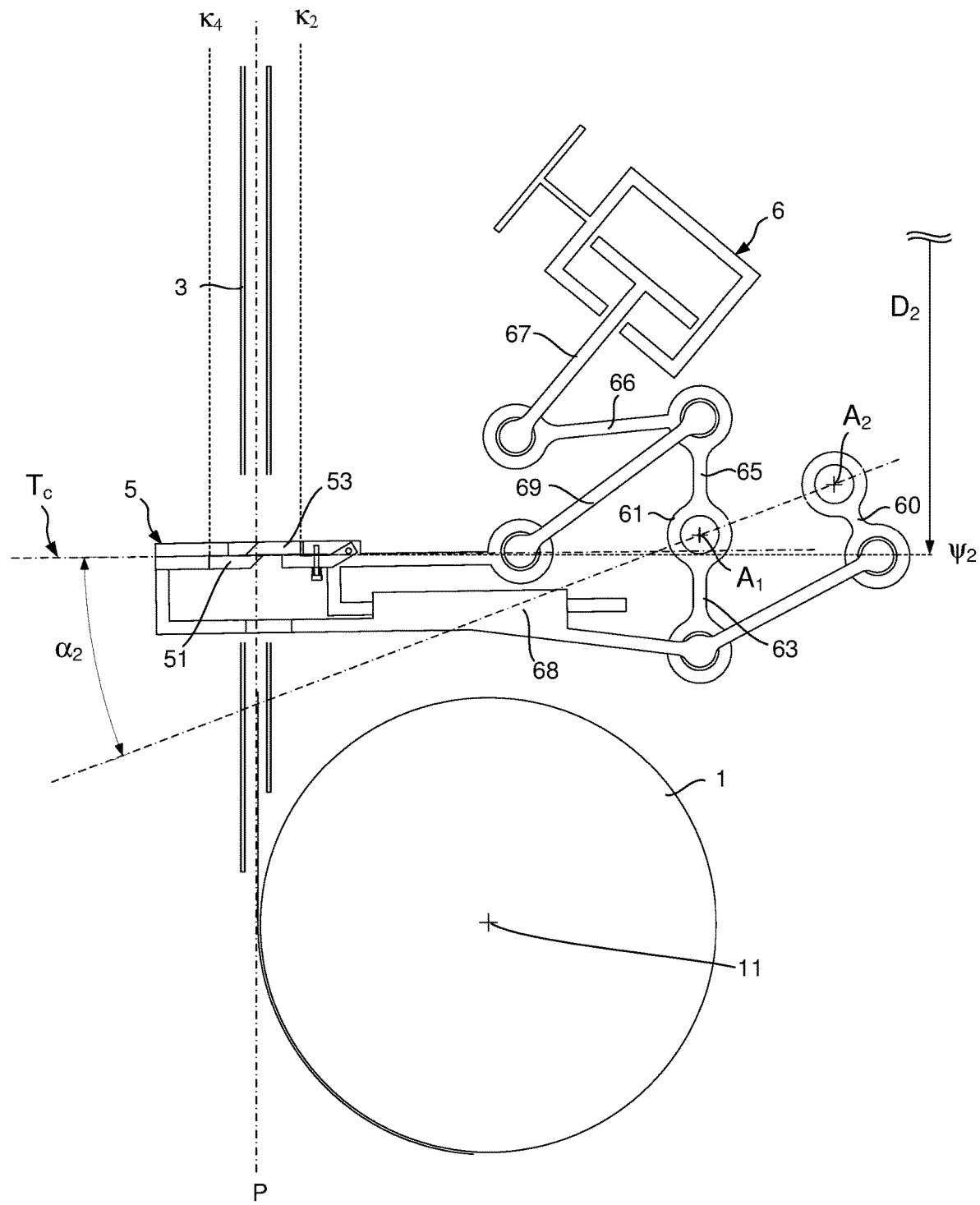
FIG. 6 is a schematic view of the cutting system, showing the cutting tools in the end position along the guiding plane and in two active positions along the cutting direction.

FIG. 6, the two cutting tools 51, 53 have displaced to their end position ψ$_2$ for which the distance along the guiding plane P between the cutting direction T$_c$ and the fixed position of the rerouting means is equal to D$_2$. The tools 51, 53 have also displaced into the active positions κ$_2$, κ$_4$ along the cutting direction T$_c$. The cutting direction T$_c$ makes an angle α$_2$ with the direction passing through the rotation axes A$_1$ and A$_2$. This angle and the active positions κ$_2$, κ$_4$ along the cutting direction T$_c$ are determined by the angular orientation of the control lever 61, itself determined by the extended position of the cylinder rod 67.

In either of the angles α$_1$, α$_2$ taken by the cutting direction T$_c$, the cutting tools 51, 53 remain aligned along the direction, which is ensured by the sliding connection means 68.

Figure 7:
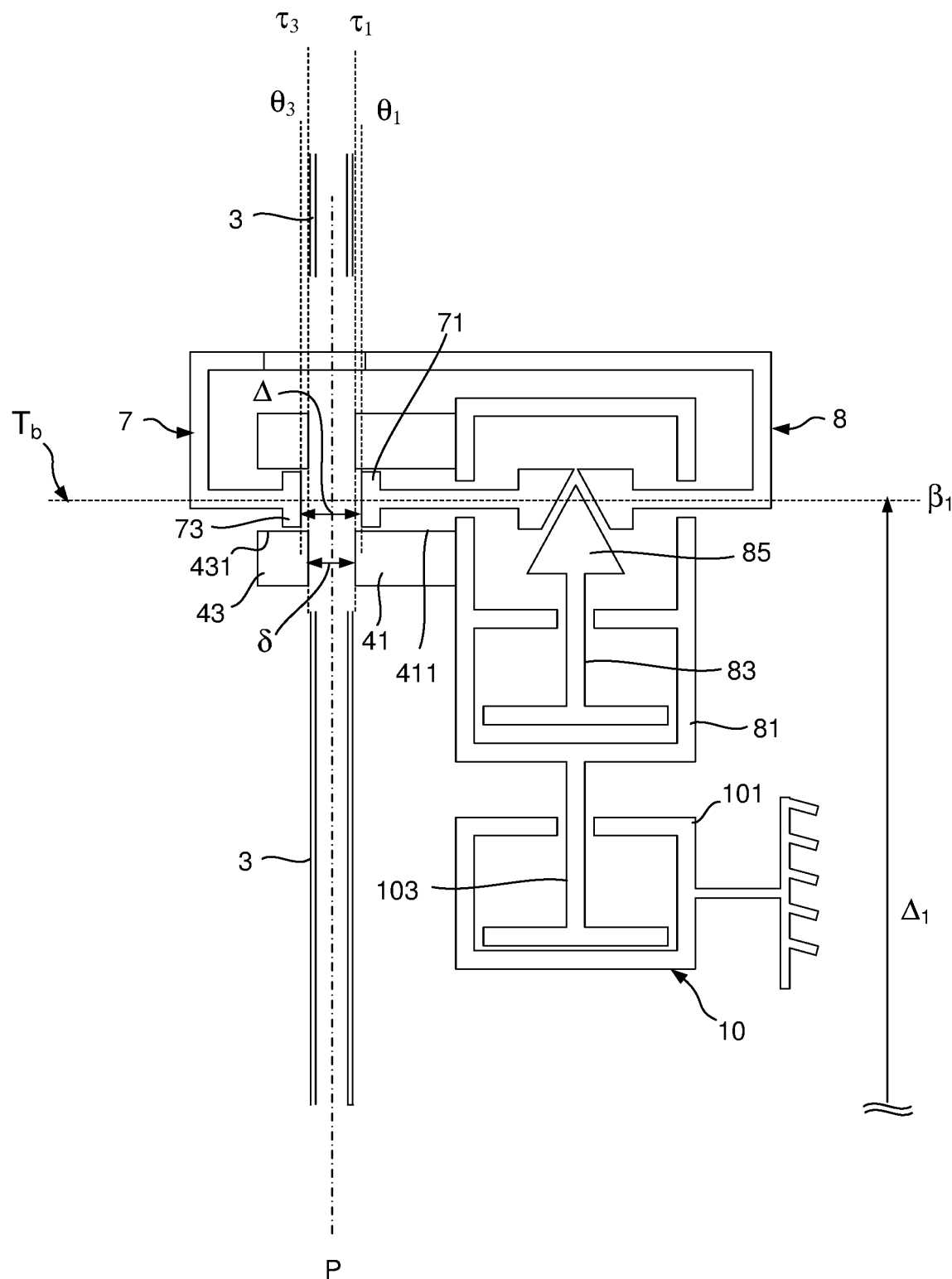
FIG. 7 is a schematic view of the clamping system, showing the clamping tools in the initial position along the guiding plane and in two inactive positions along a clamping direction.

FIG. 7, the two clamping tools 71, 73 are in their initial position β$_1$ in which the distance along the guiding plane P between the clamping direction T$_b$ and the fixed position of the rerouting means is Δ$_1$. The tools are in their inactive positions θ$_1$, θ$_3$ along the clamping direction T$_b$, set back from the positions τ$_1$, τ$_3$ of the stripper means 41, 43. The setback is due to the fact that the distance δ between the stripper means is less than the distance Δ between the inactive positions θ$_1$, θ$_3$ of the clamping tools 71, 73 along the clamping direction T$_b$. The stripper means comprise a first stripping plate 41 with a through hole 411 for the passage of the first clamping tool 71 and a second stripping plate 43 with a through hole 431 for the passage of the second clamping tool 73. The two stripping plates, which are parallel to each other, are fixedly mounted on the cylinder body, the two facing surfaces of the stripping plates are in the positions τ$_1$, τ$_3$ and are spaced from each other by the distance δ.

Figure 8:
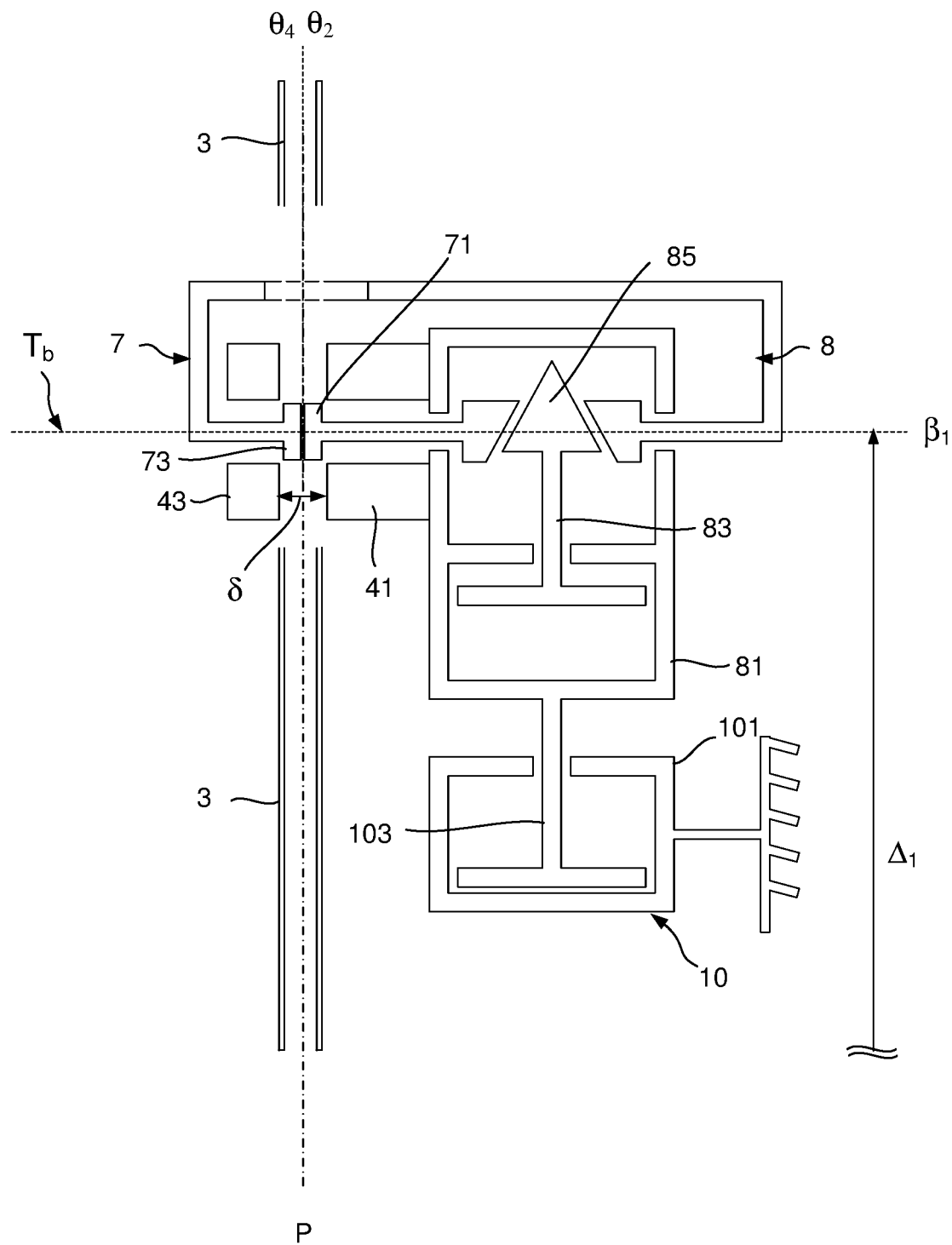
FIG. 8 is a schematic view of the clamping system, showing the clamping tools in the initial position along the guide plane and in two active positions along the clamping direction.

FIG. 8, the two clamping tools 71, 73 have remained in the initial position β$_1$ shown in FIG. 1 but have displaced, along the clamping direction T$_b$, from their inactive positions θ$_1$, θ$_3$ to the active positions θ$_2$, θ$_4$ in which they abut against each other.

Figure 9:
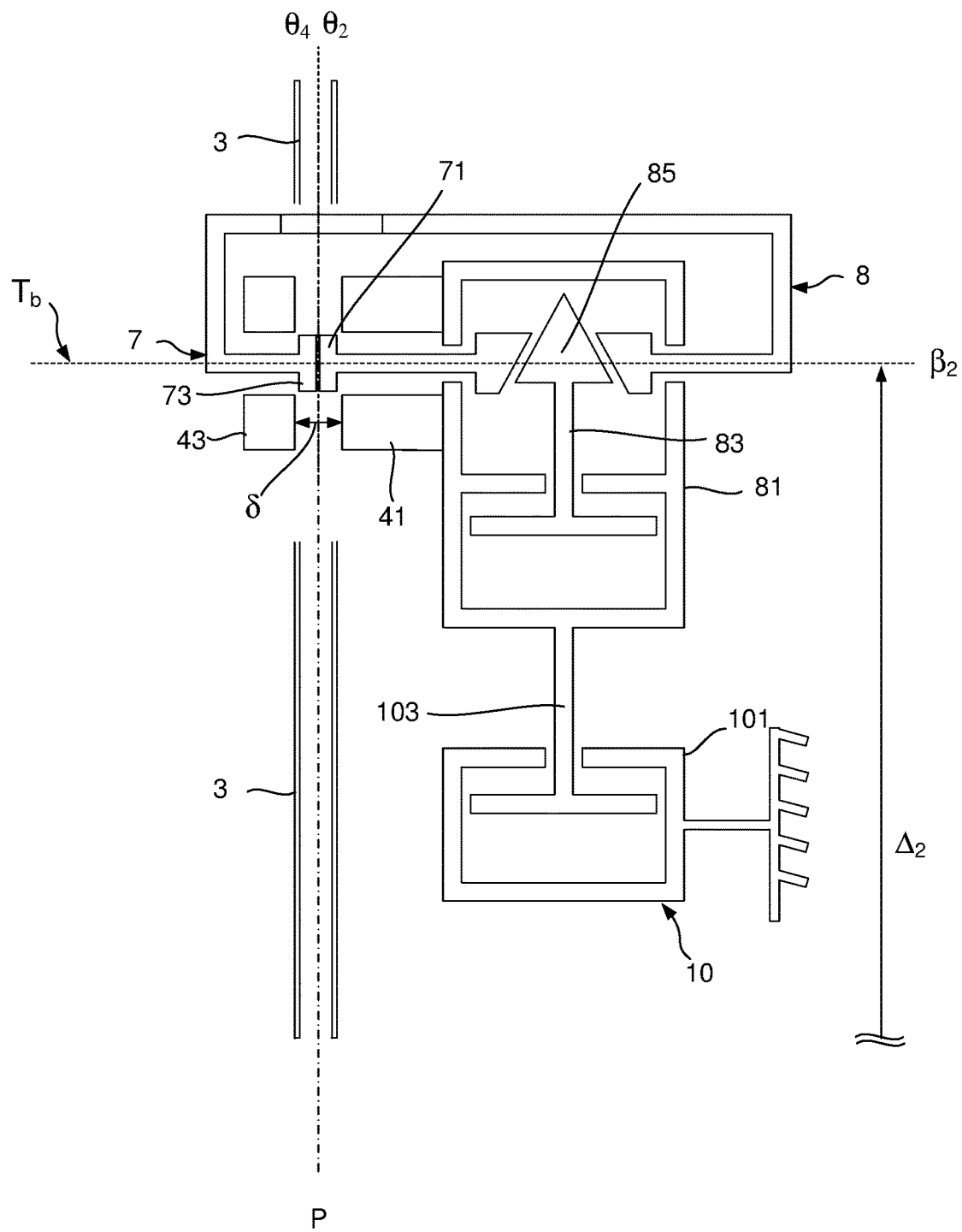
FIG. 9 is a schematic view of the clamping system, showing the clamping tools in the end position along the guide plane and in the active positions along the clamping direction.

FIG. 9, the two clamping tools 71, 73 have displaced into their final position β$_2$ for which the distance along the guiding plane between the clamping direction T$_b$ and the fixed position of the rerouting means is Δ$_2$. The stripper means 41, 43 have also displaced as a unit with the clamping tools 71, 73 in translation along the guiding plane P.

Figure 10:
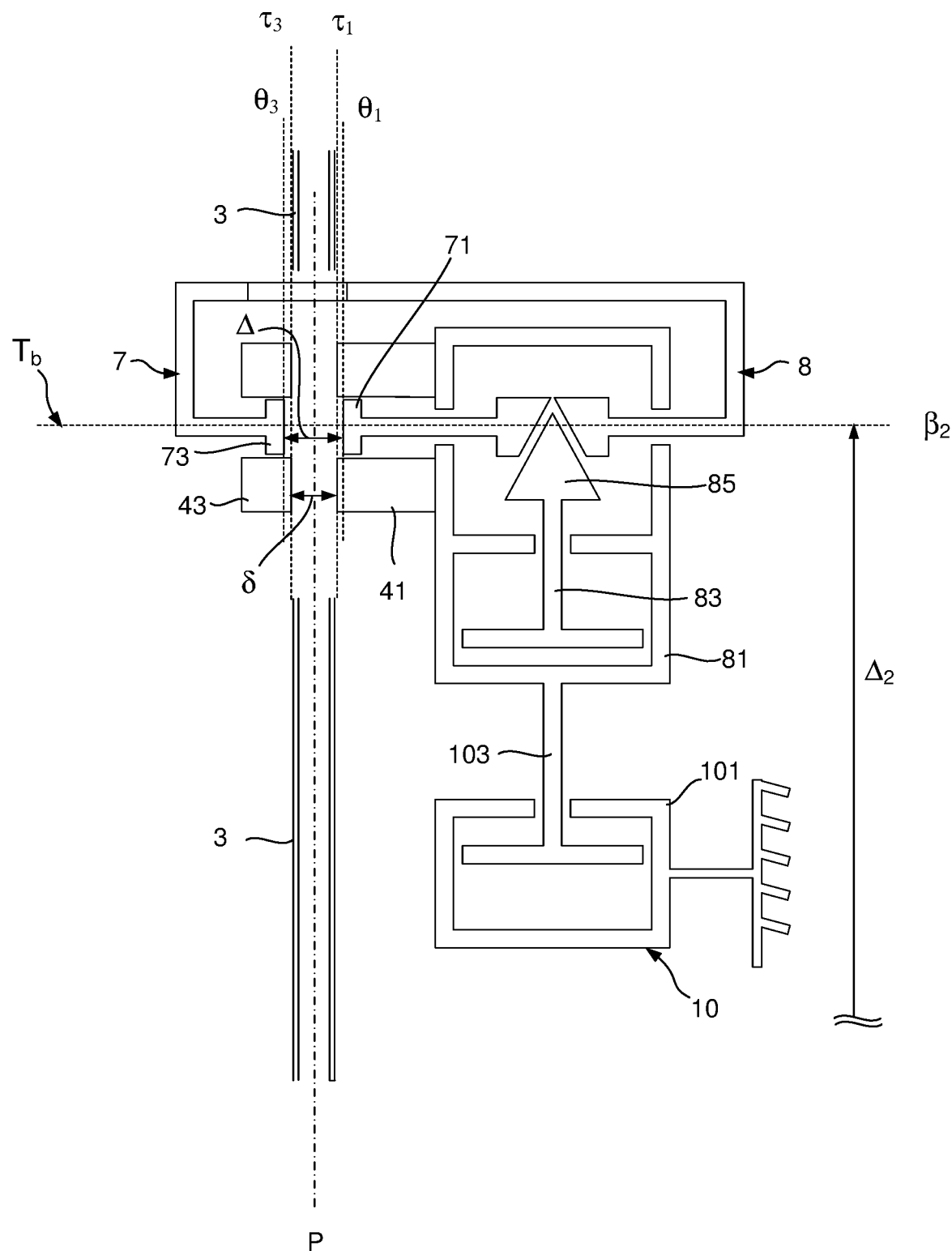
FIG. 10 is a schematic view of the clamping system, showing the clamping tools in the end position along the guiding plane and in the inactive positions along the clamping direction.

In FIG. 10, the two clamping tools 71, 73 have remained in the end position β$_2$ shown in FIG. 9, but have displaced, along the clamping direction T$_b$, from their active positions to inactive positions θ$_1$, θ$_3$ in which they are set back from the positions τ$_1$, τ$_3$ of the stripper means 41, 43.

In the above-described embodiment, the first cutting tool 51 comprises a first blade provided with a bevel 56 defining a first cutting edge 52 and the second cutting tool 53 comprises a second blade provided with a bevel 58 and defining a second cutting edge 54. The first and second cutting edges 52, 54 form between them a cutting angle φ and the bevels 56, 58 are opposed to allow an overlapping of the cutting edges 52, 54 and propagate a cutting point at the apex of the cutting angle φ, during a time interval defined by an initial instant and an end instant, corresponding respectively to the inactive positions κ$_1$, κ$_3$ and the active positions κ$_2$, κ$_4$ of the blades 51, 53 along the cutting direction T$_c$.

The first blade 51 is fixed to a first blade holder 57. The second blade 53 is fixed to a second blade holder 59 by means of a part 55 pivoting relative to the second blade holder 59 around an axis 50 and is pressed against the first blade holder 57 by an elastic return means to control the clearance necessary for the overlapping of the cutting edges 52, 54 of the blades 51, 53. The elastic return means is, for example, a spring mounted around a screw 4 passing through the intermediate part 55 to be screwed into the second blade holder 59, the spring being arranged between the screw head and the intermediate part. According to an embodiment variant, the second blade is elastically biased in abutment directly against the first blade, either flat or by its cutting edge against the first blade, for example according to the mounting principle described in the above-mentioned application WO 2017/072421.

Figure 11:
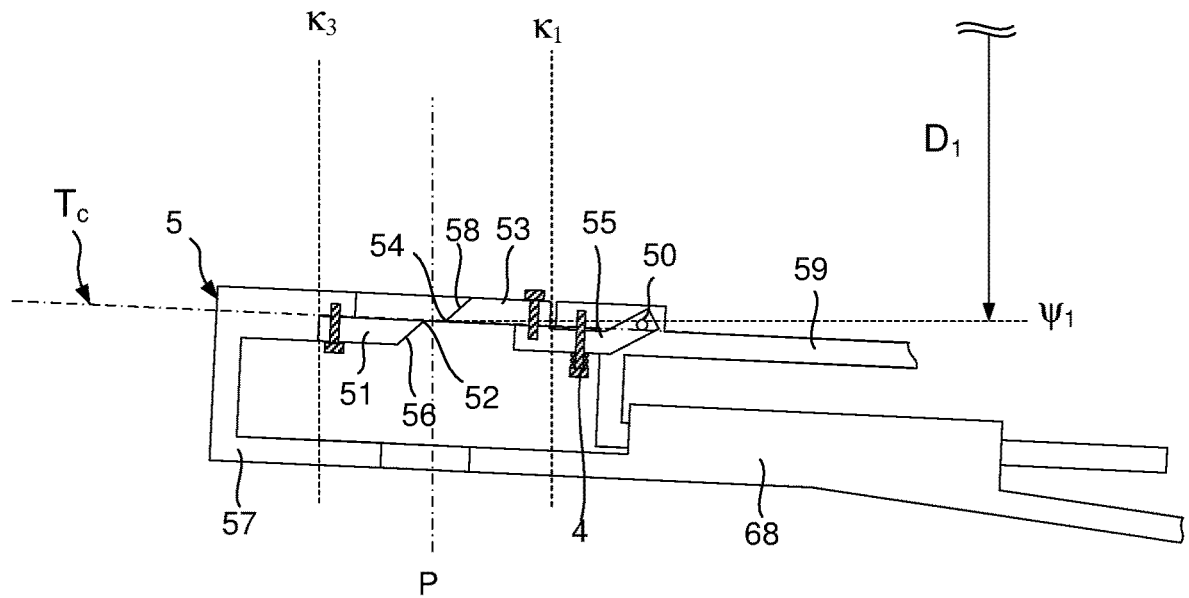
FIG. 11 is an enlarged partial view of the cutting system in FIG. 5.
Figure 13:
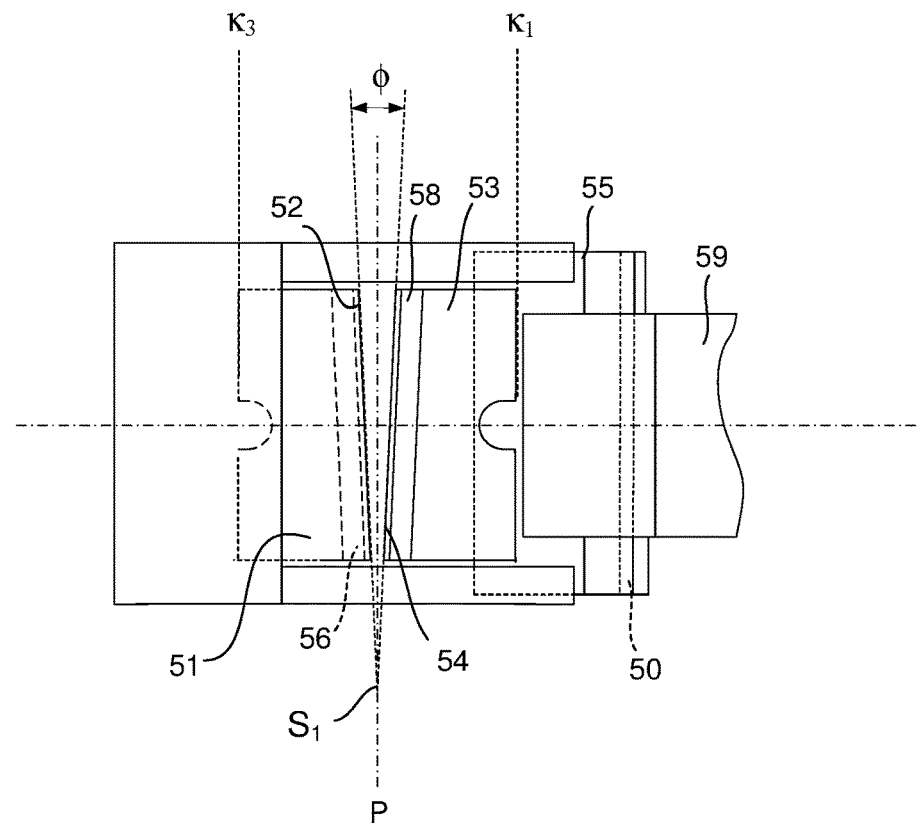
FIG. 13 is an enlarged top view of the cutting system in FIG. 5.

Referring to FIGS. 11 and 13, the first and second blades 51, 53 are in their inactive positions κ$_1$, κ$_3$ along the cutting direction T$_c$. The apex of the cutting angle φ is in an initial position S$_1$ determined by the inactive positions κ$_1$, κ$_3$ in which the cutting edges 52, 54 of the bevels 56, 58 are not overlapped.

Figure 12:
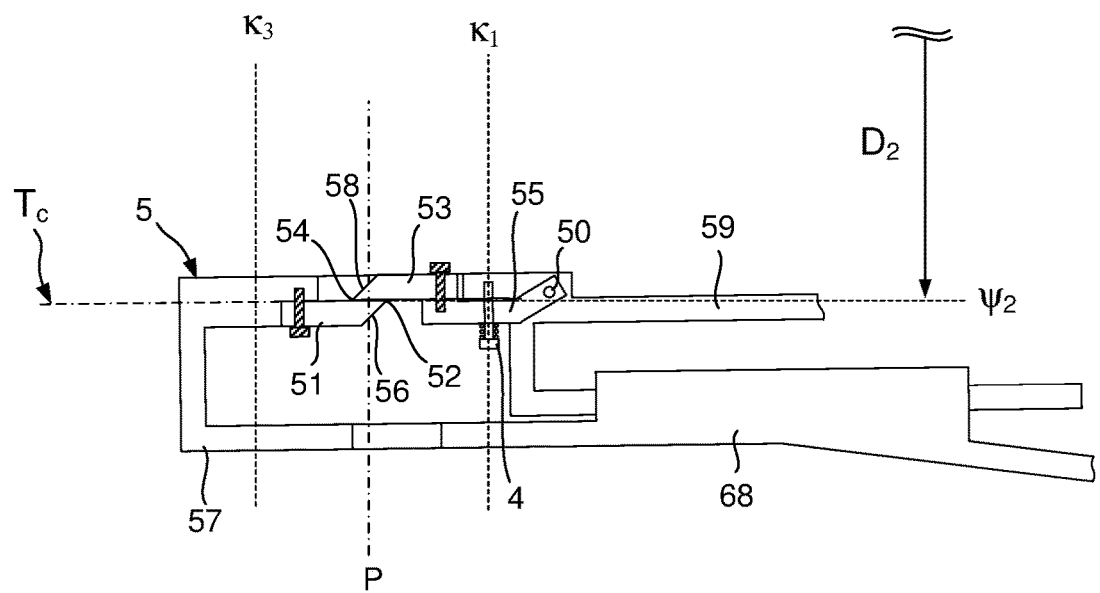
FIG. 12 is an enlarged partial view of the cutting system in FIG. 6.
Figure 14:
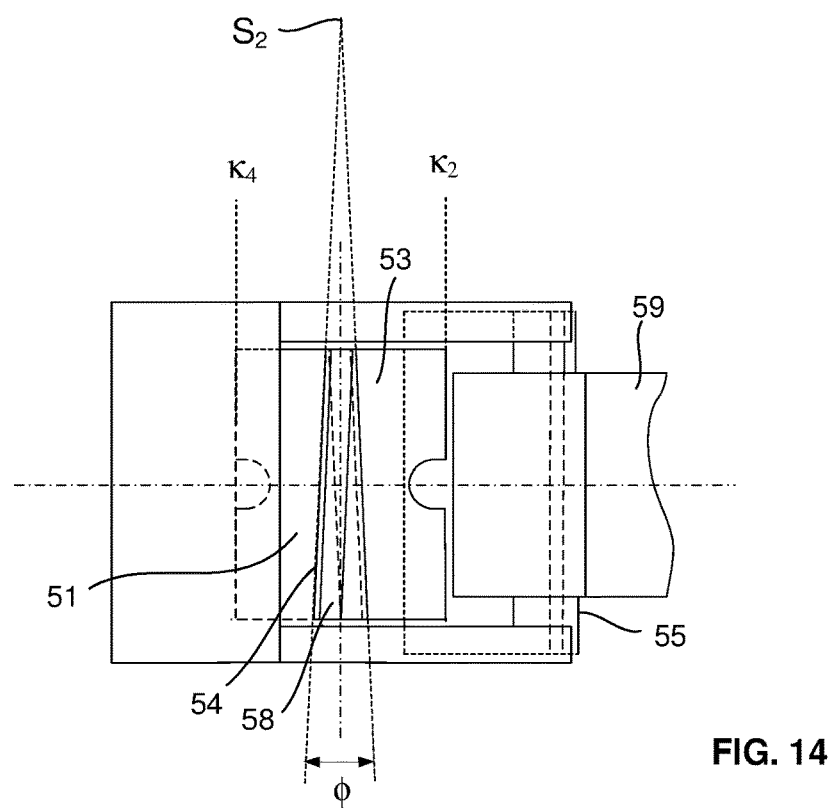
FIG. 14 is an enlargement of the cutting means shown in FIG. 6, in top view.

Referring to FIGS. 12 and 14, the first and second blades 51, 53 have displaced into their active positions κ$_2$, κ$_4$ in the cutting direction T$_c$. The apex of the cutting angle φ is in an end position S$_2$ determined by the active positions κ$_2$, κ$_4$ in which the cutting edges 52, 54 of the bevels 56, 58 are overlapped.

Between the inactive positions κ$_1$, κ$_3$ and active positions κ$_2$, κ$_4$, the apex S$_1$, S$_2$ of the cutting angle φ has propagated as the overlapping of the cutting edges 52, 54 has increased.

The cutting edges 52, 54 are rectilinear and form a constant cutting angle φ, from the inactive positions κ$_1$, κ$_3$ to the active positions κ$_2$. The bisector of the cutting angle φ is perpendicular to the cutting direction T$_c$. In FIGS. 13 and 14, the inactive positions κ$_1$, κ$_3$ and the active positions κ$_2$, κ$_4$ are advantageously chosen symmetrically with respect to the guiding plane P so that the bisector of the cutting angle φ is coincident with the guiding plane P.

Figure 15:
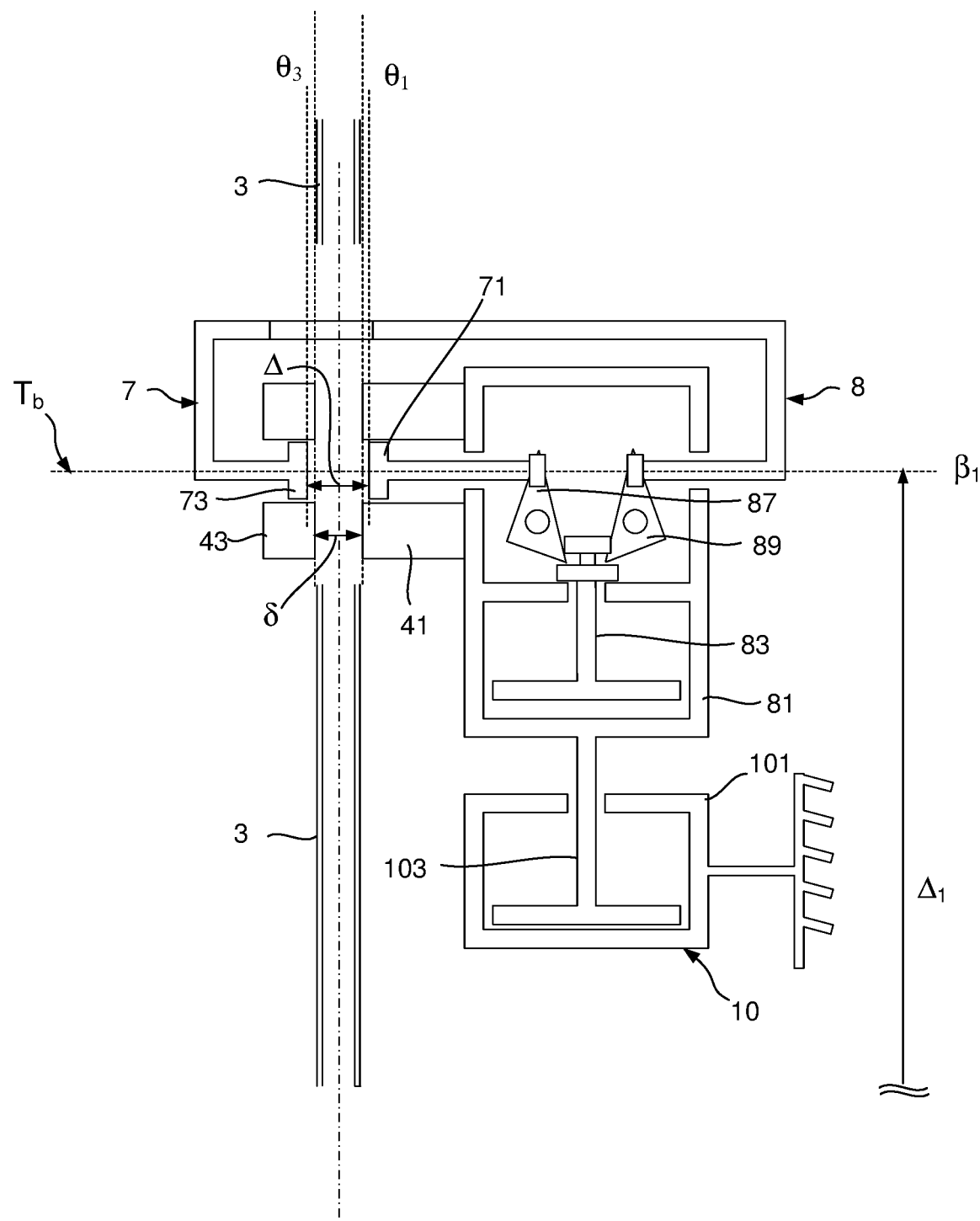
FIG. 15 is a schematic view of the clamping system in a variant embodiment, showing the clamping tools in the initial position along the guiding plane and in the inactive positions along the clamping direction.
Figure 16:
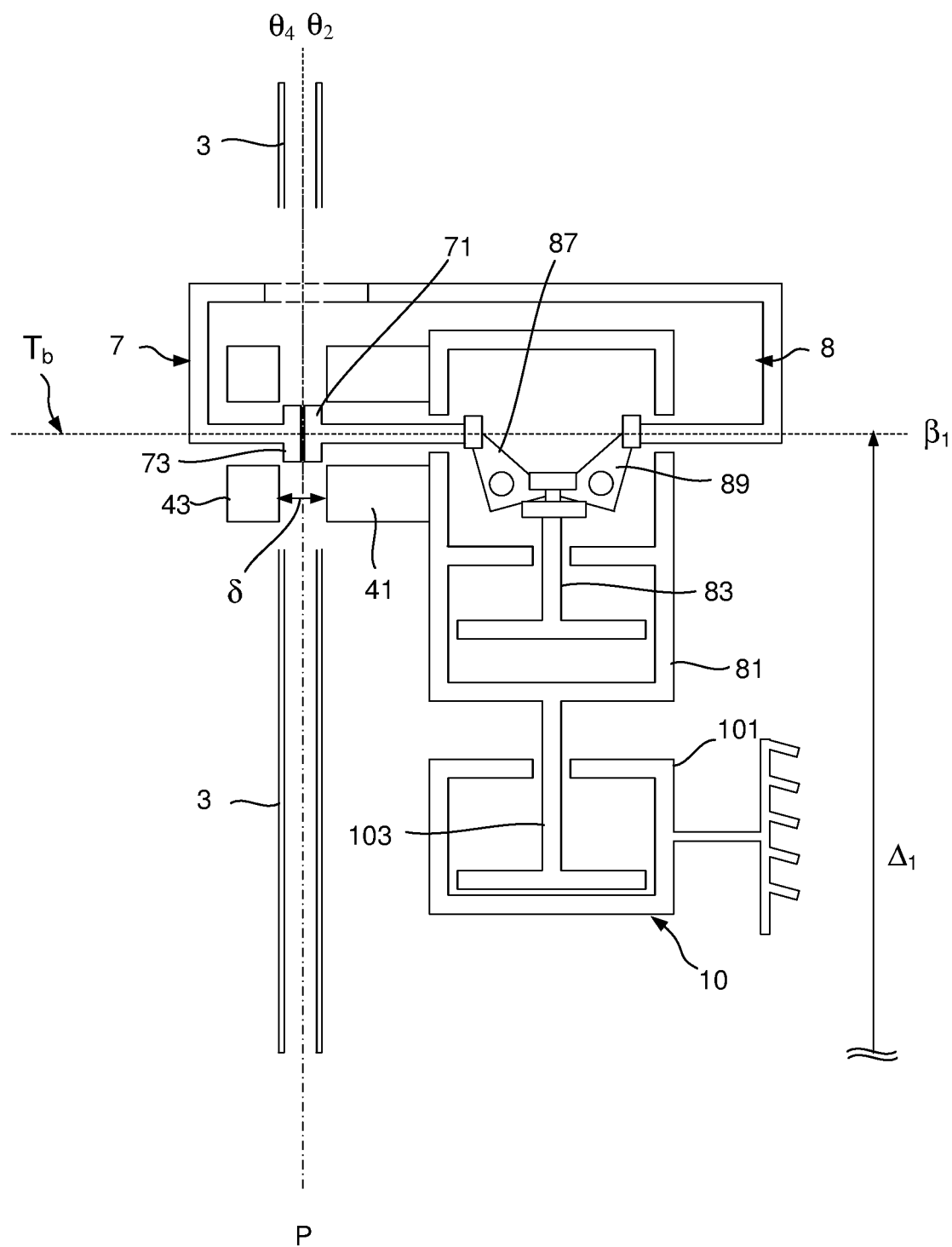
FIG. 16 is a schematic view of the clamping system, showing the clamping tools in the initial position along the guiding plane and in the active positions in the clamping direction.

An alternative embodiment of the control means 8 of the clamping means 71, 73 is that the rod 83 of the cylinder 81 cooperates with the first and second clamping means 71, 73 by means of first and second levers 87, 89 articulated to the clamping means. The cylinder 81 is a parallel gripper type cylinder. It advantageously enables multiplication of the clamping forces. Referring to FIG. 15, the rod 83 is in retracted position $\theta_1$, $\theta_3$ and controls the clamping means 71, 73 in their inactive positions along the clamping direction $T_b$. Referring to FIG. 16, the rod 83 is in an extended position and controls the clamping means 71, 73 in their active positions $\theta_2$, $\theta_4$ along the clamping direction $T_b$.

A second embodiment of the invention differs from the previous one in that the first control means for the cutting tools 51, 53 is a control means for controlling in translation along the guiding plane P. This control means is analogous to the control means 10 for the first and second clamping tools in block, in translation along the guiding plane and described with reference to FIGS. 7 to 10.

A means able to displace the cutting tools 51, 53 one and the other in the cutting direction $T_c$ between the respective inactive positions $\kappa_1$, $\kappa_3$ and active positions $\kappa_2$, $\kappa_4$ comprises a cylinder actuating a cylinder rod cooperating with the cutting tools via a transmission cone or via first and second levers connected respectively to the first and second cutting tools. It is analogous to control means 8 of the first and second clamping tools for controlling in translation along the clamping direction and is described with reference to FIGS. 7 to 10 or FIGS. 15 to 16.

The application head according to embodiments of the invention is especially designed for installation in a fiber placement machine for the production of composite material parts.

A fiber 2 is applied to a substrate (not shown) by the application roller 1 as the application head displaces relative to the substrate. The fiber is guided by the guiding means in the guiding plane P.

A "cut on the fly" operation comprises the following steps:
  first step: FIG. 1, during layup, the fiber 2 circulates freely through the cutting tools 51, 53 and the clamping tools 71, 73. The inactive positions $\kappa_1$, $\kappa_3$ of the cutting means, FIG. 5, define a rest state along the cutting direction $T_c$. Likewise, the inactive positions $\theta_1$, $\theta_3$ of the clamping means, FIG. 7 define a rest state along the clamping direction $T_b$.
  second step: FIG. 2, the fiber 2 is cut by the cutting tools 51, 53 and clamped by the clamping tools 71, 73. The active positions $\kappa_2$, $\kappa_4$ of the cutting tools, FIG. 6, define an active state along the cutting direction $T_c$. Likewise, the active positions $\theta_2$, $\theta_4$ of the clamping tools, FIG. 8, define an active state in the clamping direction $T_b$.

Between the first and second steps, the cutting tools 51, 53 have undergone, along the guiding plane P, the positive variation in distance $D_2$-$D_1$. This variation makes it possible to displace the cutting direction $T_c$ at the same time as fiber 2 and thus leads to cancelling the inclination of the cut end of the fiber.

The inactive positions $\kappa_1$, $\kappa_3$ along the cutting direction $T_c$ are symmetrical with respect to the guiding plane P and the cutting tools 51, 53 are displaced towards their active positions $\kappa_2$, $\kappa_4$ at the same translation speed. Thus it is possible to cut the fiber 2 "in the middle", that is without deviation from the guiding plane P.

Likewise, the inactive positions $\theta_1$, $\theta_3$ along the clamping direction $T_b$ are symmetrical with respect to the guiding plane P and the clamping tools 71, 73 are displaced towards their active positions $\theta_2$, $\theta_4$ at an identical translation speed. Thus, it is possible to clamp the fiber 2 "in the middle", that is, without deviation from the guiding plane P.
  third step: FIG. 3, the cutting tools 51, 53 remain in the active state. Similarly, the clamping tools 71, 73 remain in the active state.

Between the second and third steps, the clamping tools 71, 73 have undergone the positive variation in distance $\Delta_2$-$\Delta_1$ along the guiding plane P. This variation makes it possible to displace the cut and clamped fiber 2 in the opposite direction to the travel direction imposed by the rotation direction of the application roller 1.
  fourth step: FIG. 4, the cutting tools 51, 53 are again in the resting state. The clamping tools 71, 73 remain in the active state.

Between the third and fourth steps, the cutting tools 51, 53 have undergone, along the guiding plane P, the negative variation in distance $D_1$-$D_2$. The variation in distance $\Delta_2$-$\Delta_1$ of the clamping tools 71, 73 is chosen to be greater than the variation of distance $D_2$-$D_1$ of the cutting tools to allow the latter to return to the distance $D_1$ of the rerouting means 9 without the risk of coming into contact with the fiber 2.
  fifth step: the clamping tools 71, 73 are again in the resting state. The cutting tools 51, 53 remain in the resting state. The fiber 2 circulates freely after it has been rerouted by the rerouting means.

Between the fifth step and the first step of the next on-the-fly cut, the clamping tools 71, 73 are subjected to the negative variation in distance $\Delta_1$-$\Delta_2$ along the guiding plane P.

The "on-the-fly" cutting operation described above can be carried out with an application head in which only one of the two cutting tools is movable in translation along the cutting direction, the other tool being in a fixed position along the direction. For example, WO 2008/132301 describes a movable blade coming, in the active position, into abutment against a counter-tool fixed along the cutting direction, formed of a bar made of elastomeric material.

Similarly, the "on-the-fly" cutting operation can be carried out with an application head in which only one of the two clamping tools is movable in translation in the clamping direction, the other tool being in a fixed position along the clamping direction. WO 2008/132301 or EP 846551 describes a movable jaw which, in the active position, abuts against a counter tool which is fixed along the clamping direction.

The invention claimed is:

1. Application head especially designed for producing composite material parts, comprising an application system, guiding means defining a guiding plane, a cutting system and a clamping system, the cutting system comprising a first cutting tool movable in translation along a cutting direction and a second cutting tool, the clamping system comprising a first clamping tool movable in translation along a clamping direction and a second clamping tool, comprising a first control means able to displace said cutting tools together between initial and final cutting positions representing a variation in distance along the guiding plane and comprising a second control means, distinct from the first control means, able to displace said clamping tools together between initial and final clamping positions representing a variation in distance along the guiding plane.

2. Application head according to claim 1, wherein said first control means is an integrated control means able to displace the first cutting tool along the cutting direction and to displace together said cutting tools between said initial and final positions.

3. Application head according to claim 2, wherein the integrated control means is able to displace the first cutting tool and the second cutting tool in translation along the cutting direction between inactive positions and active positions.

4. Application head according to claim 3, wherein the integrated control means comprises a control lever movable around a first rotation axis and provided with a first lever arm articulated to a first tool holder carrying the first cutting tool and a second lever arm articulated, by means of a link, to a second tool holder carrying the second cutting tool, said second lever arm being controlled in displacement by a cylinder rod, said first blade holder being articulated to a second rotation axis by means of a link and said first and second tool holders being connected together by a sliding connecting means for sliding along the cutting direction.

5. An application head according to claim 1, wherein the first cutting tool comprises a first blade provided with a bevel defining a first cutting edge and the second cutting tool comprises a second blade provided with a bevel defining a second cutting edge, said bevels being opposed to allow an overlapping of said cutting edges.

6. Application head according to claim 1, wherein said second control means for the clamping tools is a control means for controlling in translation along the guide plane.

7. Application head according to claim 1, wherein the clamping system comprises a third control means able to displace a first clamping tool along a clamping direction.

8. Application head according to claim 7, wherein the first and second clamping tools are both movable along the clamping direction between respective inactive positions and active positions, said third control means being able to displace the first clamping tool and the second clamping tool in translation along the cutting direction between the inactive positions and the active positions.

9. An application head according to claim 8, wherein it comprises stripper means fixed along the clamping direction in positions with respect to which said respective inactive positions of the clamping tools are set back.

10. Application head according to claim 9, wherein said second control means able to displace said clamping tools together is also able to displace the stripper means in translation along the guide plane.

11. Method for manufacturing a composite material part comprising the application of continuous fibers to an application surface, wherein the application of fibers is carried out by means of a fiber application head according to claim 1, by relative displacement of the application head with respect to the layup surface along layup trajectories.

* * * * *